(12) United States Patent
Sen et al.

(10) Patent No.: US 11,106,361 B2
(45) Date of Patent: Aug. 31, 2021

(54) TECHNOLOGIES FOR LOCKLESS, SCALABLE, AND ADAPTIVE STORAGE QUALITY OF SERVICE

(71) Applicant: Intel Corporation, Santa Clara, CA (US)

(72) Inventors: Sujoy Sen, Beaverton, OR (US); Siddhartha Kumar Panda, Santa Clara, CA (US); Jayaraj Puthenpurackal Rajappan, Santa Clara, CA (US); Kunal Sablok, Bangalore (IN); Ramkumar Venkatachalam, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 16/416,696

(22) Filed: May 20, 2019

(65) Prior Publication Data
US 2020/0371689 A1 Nov. 26, 2020

(51) Int. Cl.
*G06F 3/06* (2006.01)
(52) U.S. Cl.
CPC .............. *G06F 3/061* (2013.01); *G06F 3/067* (2013.01); *G06F 3/0655* (2013.01)
(58) Field of Classification Search
CPC ......... G06F 3/061; G06F 3/067; G06F 3/0655
See application file for complete search history.

(56) References Cited

U.S. PATENT DOCUMENTS

| 9,910,621 | B1* | 3/2018 | Golan | G06F 3/0689 |
| 2003/0081612 | A1* | 5/2003 | Goetzinger | H04L 47/568 |
| | | | | 370/395.21 |
| 2009/0003204 | A1* | 1/2009 | Okholm | H04L 69/12 |
| | | | | 370/230 |
| 2009/0103438 | A1* | 4/2009 | Groh | H04W 72/1242 |
| | | | | 370/235 |

* cited by examiner

*Primary Examiner* — Francisco A Grullon
(74) *Attorney, Agent, or Firm* — Compass IP Law PC

(57) ABSTRACT

Technologies for quality of service (QoS) management include a computing device having a physical storage volume and multiple processor cores. A management thread reads I/O counters that are each associated with a logical volume and a processor core. The logical volumes are backed by the physical storage volume. The management thread configures stop bits as a function of the I/O counters and multiple QoS parameters. Each stop bit is associated with a logical volume and a processor core. The QoS parameters include minimum guaranteed bandwidth and optional maximum allowed bandwidth for each logical volume. A worker thread reads the stop bit associated with a logical volume and a processor core, accesses the logical volume if the stop bit is not set, and updates the I/O counter associated with the logical volume and the processor core in response to accessing the logical volume. Other embodiments are described and claimed.

25 Claims, 7 Drawing Sheets

TECHNOLOGIES FOR LOCKLESS, SCALABLE, AND ADAPTIVE STORAGE QUALITY OF SERVICE

BACKGROUND

Typical cloud computing environments may include multiple logical volumes created and deleted based on customer workload requirements. Some of those logical volumes may share the same base physical device. Cloud customers may demand certain quality of service (QoS) guarantees for logical volumes, such as minimum guaranteed bandwidth, maximum allowed bandwidth, or banding support. Enforcing storage QoS parameters across multiple processor cores executing in parallel typically requires introducing locks or serializing QoS on a single processor core.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
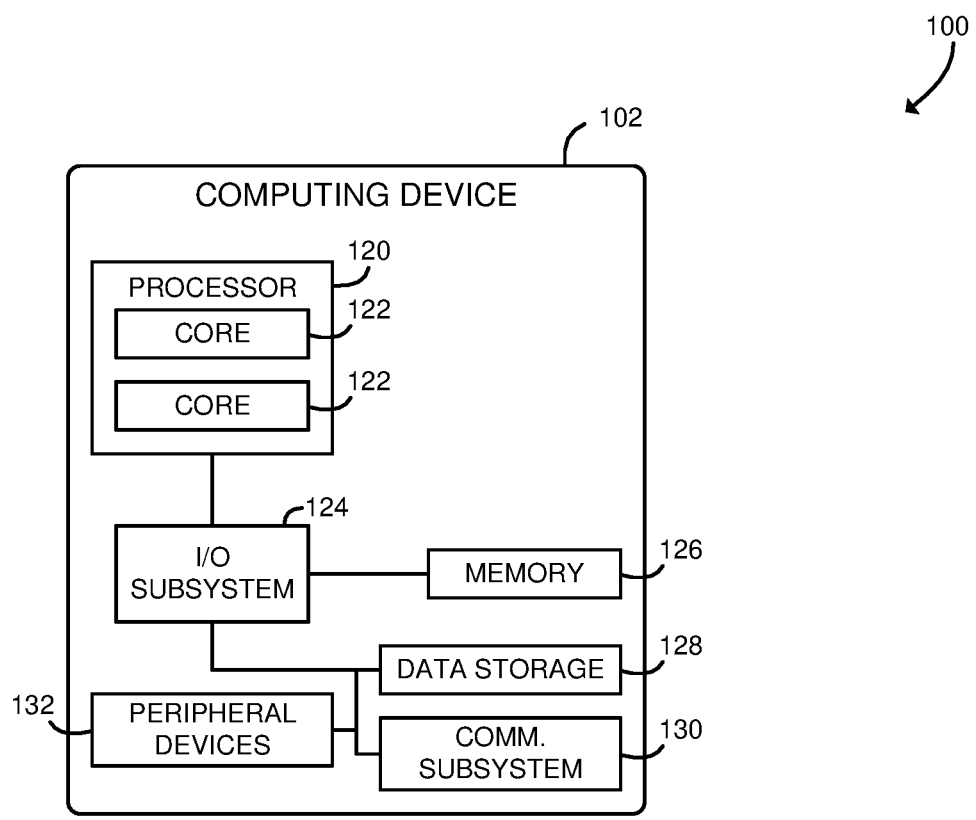
FIG. 1 is a simplified block diagram of at least one embodiment of a system for lockless, scalable, and adaptive storage quality of service (QoS) management.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for lockless, scalable, and adaptive storage quality of service (QoS) management includes a computing device 102 having one or more physical storage devices 128. Multiple logical volumes are established that are each backed by the same physical base device 128 (or storage device pool). The computing device 102 establishes QoS parameters for each logical volume, including minimum guaranteed bandwidth and maximum allowed bandwidth. Multiple worker threads executing on multiple processor cores perform I/O operations (IOPs) on the logical volumes and update I/O counters based on the IOPs. A management thread reads and aggregates the I/O counters, evaluates the QoS parameters, and controls the worker threads to enforce the QoS parameters. In some embodiments, the computing device 102 may adapt the QoS parameters based on bandwidth usage by the logical volumes. The computing device 102 performs those functions without locking, serialization, or other synchronization operations. Thus, the system 100 may decouple run-time QoS policy enforcement from the data path, which may allow a high performance, lockless, and multi-core scalable data path to coexist with QoS bandwidth controls. The system 100 may also allow volume-level QoS to be efficiently allocated from an underlying storage device hierarchy. Additionally, adaptive QoS may allow dynamic and efficient sharing of unused performance of the underlying base device, while still providing high performance for bursts of I/O activity.

The computing device 102 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively include a processor 120, an input/output subsystem 124, a memory 126, a data storage device 128, and a communication subsystem 130, and/or other components and devices commonly found in a server or similar computing device. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. Illustratively, the processor 120 is a multi-core processor 120 having two processor cores 122, each of which is an independent, general-purpose processing unit capable of executing programmed instructions. For example, each processor core 122 may execute instructions from a general-purpose instruction set architecture (ISA) such as IA-32 or Intel 64. Of course, in other embodiments the processor 120 may be embodied as a single or multi-core processor(s), digital signal processor, microcontroller, or other processor or processing/controlling circuit. Additionally, although illustrated as including a single processor 120, in some embodiments, each computing device 102 may be embodied as a multi-socket server with multiple processors 120. Similarly, the memory 126 may be embodied as any type of volatile or non-volatile memory or data storage capable of performing the functions described herein. In operation, the memory 126 may store various data and software used during operation of the computing device 102 such as operating systems, applications, programs, libraries, and drivers.

As shown, the processor 120 is communicatively coupled to the I/O subsystem 124, which may be embodied as circuitry and/or components to facilitate input/output operations with the processor 120, the memory 126, and other components of the computing device 102. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 126 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 126, and/or other components of the computing device 102, on a single integrated circuit chip.

The data storage device 128 may be embodied as any type of device or devices configured for short-term or long-term storage of data such as, for example, memory devices and circuits, memory cards, hard disk drives, solid-state drives, non-volatile flash memory, or other data storage devices. The computing device 102 also includes the communication subsystem 130, which may be embodied as any communication circuit, device, or collection thereof, capable of enabling communications between the computing device 102 and other remote devices over a computer network. The communication subsystem 130 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication As shown, the computing device 102 may further include one or more peripheral devices 132. The peripheral devices 132 may include any number of additional input/output devices, interface devices, hardware accelerators, and/or other peripheral devices. For example, in some embodiments, the peripheral devices 132 may include a touch screen, graphics circuitry, a graphical processing unit (GPU) and/or processor graphics, an audio device, a microphone, a camera, a keyboard, a mouse, a network interface, and/or other input/output devices, endpoints, interface devices, and/or peripheral devices.

Figure 2:
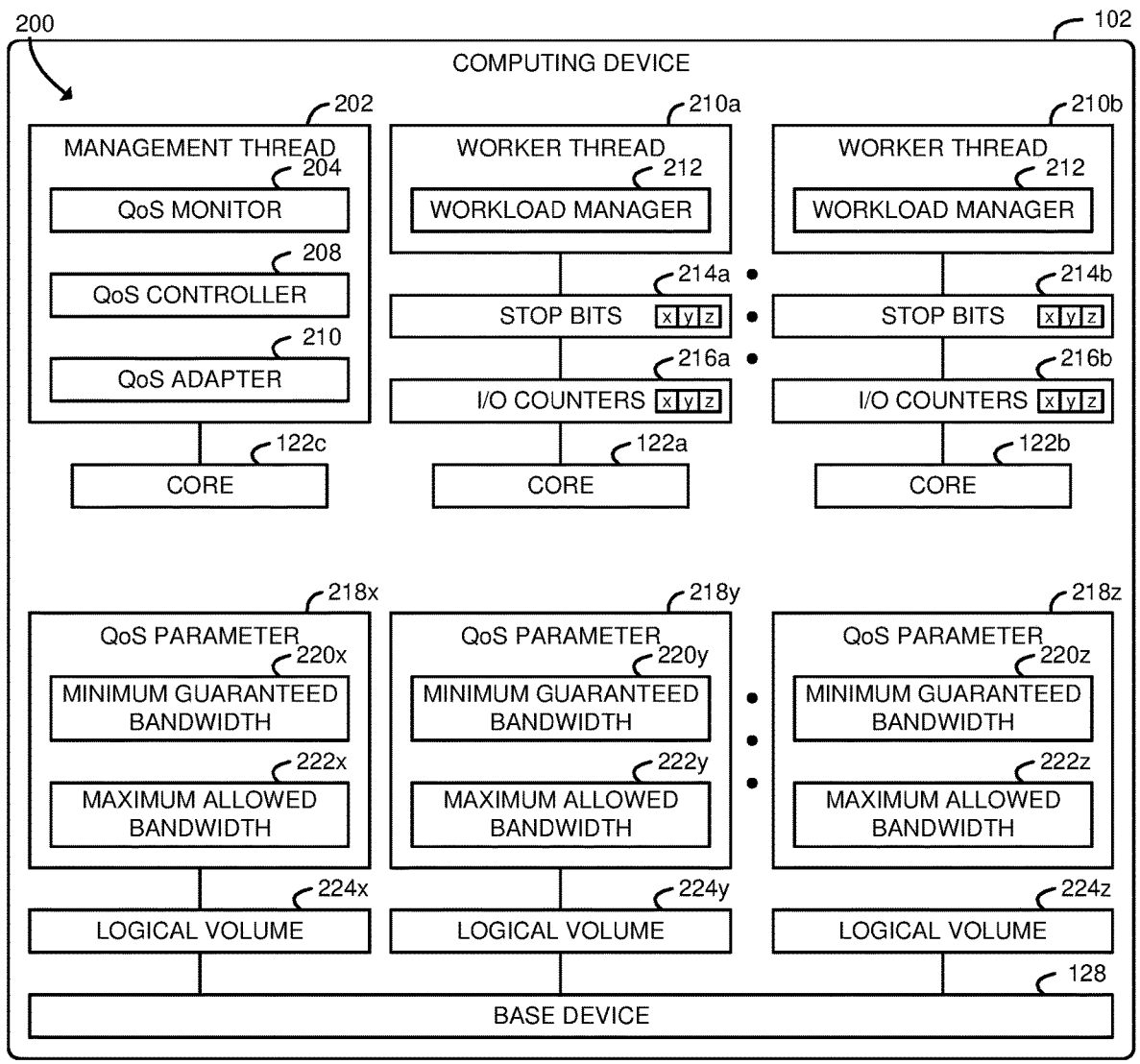
FIG. 2 is a simplified block diagram of at least one embodiment of an environment of a computing device of FIG. 1.

Referring now to FIG. 2, in an illustrative embodiment, the computing device 102 establishes an environment 200 during operation. The illustrative environment 200 includes a management thread 202 including a QoS monitor 204, a QoS controller 206, and a QoS adapter 208, and multiple worker threads 210 each including a workload manager 212. The various components of the environment 200 may be embodied as hardware, firmware, software, or a combination thereof. As such, in some embodiments, one or more of the components of the environment 200 may be embodied as circuitry or collection of electrical devices (e.g., QoS monitor circuitry 204, QoS controller circuitry 206, QoS adapter circuitry 208, and/or workload manager circuitry 212). It should be appreciated that, in such embodiments, one or more of the QoS monitor circuitry 204, the QoS controller circuitry 206, the QoS adapter circuitry 208, and/or the workload manager circuitry 212 may form a portion of the processor 120, the I/O subsystem 124, the data storage device 128, and/or other components of the computing device 102. Additionally, in some embodiments, one or more of the illustrative components may form a portion of another component and/or one or more of the illustrative components may be independent of one another.

Each of the management thread 202 and the worker threads 210 may be embodied as any process, thread, hyperthread, or other program executed by a processor core 122 of the computing device 102. Each worker thread 210 may be bound to a particular processor core 122. For example, in the illustrative example, a worker thread 210a is executed by the processor core 122a, and a worker thread 210b is executed by a processor core 122b. Similarly, the management thread 202 may be bound to a different processor core 122, such as the processor core 122c. Although illustrated as including two worker threads 210a, 210b, it should be understood that in some embodiments the environment 200 may scale to many more worker threads 210. Additionally, although illustrated as being executed by separate cores 122, it should be understood that in some embodiments some or all of the threads 202, 210 may be executed by the same core 122.

As shown, the environment further includes multiple logical volumes 224. Each logical volume 224 may be embodied as a virtual disk, file system, or other logical volume that may be accessed by the worker threads 210. As shown, each logical volume 224 is backed by the same base device 128, which may be embodied as a data storage device 128 or a pool of data storage devices 128 (e.g., a RAID array or other storage pool). As shown, each logical volume 224 is associated with QoS parameters 218, including a minimum guaranteed bandwidth 220 and a maximum allowed bandwidth 222. Illustratively, the environment 200 includes three logical volumes 224x, 224y, 224z and three associated QoS parameters 218x, 218y, 218z. It should be understood that in some embodiments the environment 200 may scale to many more logical volumes 224.

The QoS monitor 204 is configured to read, by the management thread 202, multiple I/O counters 216. Each I/O counter 216 is associated with a logical volume 224 and a processor core 122. For example, as shown in FIG. 2, I/O counters 216a are associated with the worker thread 210a and the processor core 122a, and I/O counters 216b are associated with the worker thread 210b and the processor core 122b. The I/O counters 216a further include I/O counters 216ax, 216ay, 216az, which are associated with the logical volumes 224x, 224y, 224z, respectively. Similarly, the I/O counters 216b further include I/O counters 216bx, 216by, 216bz, which are associated with the logical volumes 224x, 224y, 224z, respectively.

The QoS controller 206 is configured to configure, by the management thread 202, multiple stop bits 214 as a function of the values of the I/O counters 216 and the QoS parameters 218. Similar to the I/O counters 216, each stop bit 214 is associated with a logical volume 224 and a processor core 122. For example, as shown in FIG. 2, stop bits 214a are associated with the worker thread 210a and the processor core 122a, and stop bits 214b are associated with the worker thread 210b and the processor core 122b. The stop bits 214a further include stop bits 214ax, 214ay, 214az, which are associated with the logical volumes 224x, 224y, 224z, respectively. Similarly, the stop bits 214b further include stop bits 214bx, 214by, 214bz, which are associated with the logical volumes 224x, 224y, 224z respectively The QoS controller 206 may be further configured to perform certain QoS operations by the management thread 202 after every major interval (e.g., 100 ms) and certain other QoS operations by the management thread 202 after every minor interval (e.g., 1 ms or polling). The QoS parameters 218 may be evaluated in terms of bandwidth credits per major interval. For example, the logical volumes 224 may be grouped into a minimum guaranteed capability group and a maximum allowed capability group, and the stop bits 214 may be cleared at every major interval. The I/O counters 216 may be read and the stop bits 214 may be configured at every minor interval. The logical volumes 224 may be moved between groups and the stop bits 214 may be set/cleared to enforce the QoS parameters 218 at every minor interval.

The QoS adapter 208 is configured to determine whether a logical volume 224 having a nonzero minimum guaranteed bandwidth 220 has consumed less than the assigned minimum guaranteed bandwidth 220 and, if so, to reassign part of that minimum guaranteed bandwidth 220 to one or more other logical volumes 224. The QoS adapter 208 is further configured to determine whether current usage of the logical volume 224 exceeds currently available bandwidth (i.e., bandwidth after reassignment) and, if so, to restore bandwidth credit to the logical volume 224 up to the original minimum guaranteed bandwidth 220.

The workload manager 212 is configured to determine, by each worker thread 210, whether a stop bit 214 associated with a logical volume 224 and the processor core 122 that executes the worker thread 210 is set. The workload manager 212 is further configured to access the logical volume 224 by the worker thread 210 if that stop bit 214 is not set. The workload manager 212 is further configured to update, by the worker thread 210, an I/O counter 216 associated with the logical volume 224 and the processor core 122 in response to accessing the logical volume 224. For example, the worker thread 210a may process an I/O operation (IOP) associated with the logical volume 224x. In that example, the worker thread 210a (executed by the processor core 122a) reads the stop bit 214ax and, if not set, submits the IOP to the logical volume 224x. The worker thread 210 updates the I/O counter 216ax based on the IOP. As another example, the worker thread 210b may process an IOP associated with the logical volume 224y. In that example, the worker thread 210b (executed by the processor core 122b) reads the stop bit 214by and, if not set, submits the IOP to the logical volume 224y. The worker thread 210 updates the I/O counter 216by based on the IOP.

Figure 3:
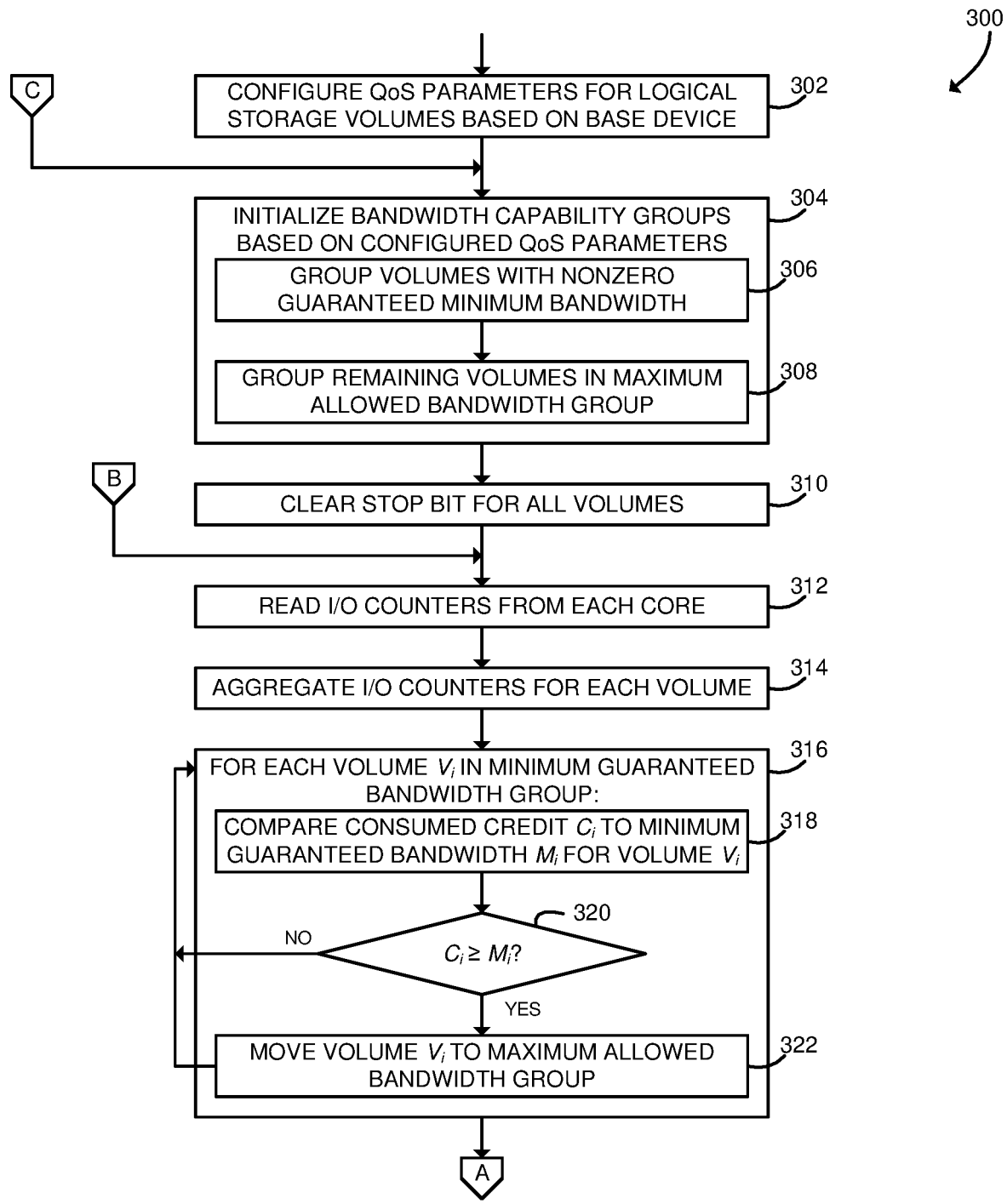
FIGS. 3 and 4 are a simplified flow diagram of at least one embodiment of a method for scalable QoS management and enforcement that may be executed by the computing device of FIGS. 1-2.
Figure 4:
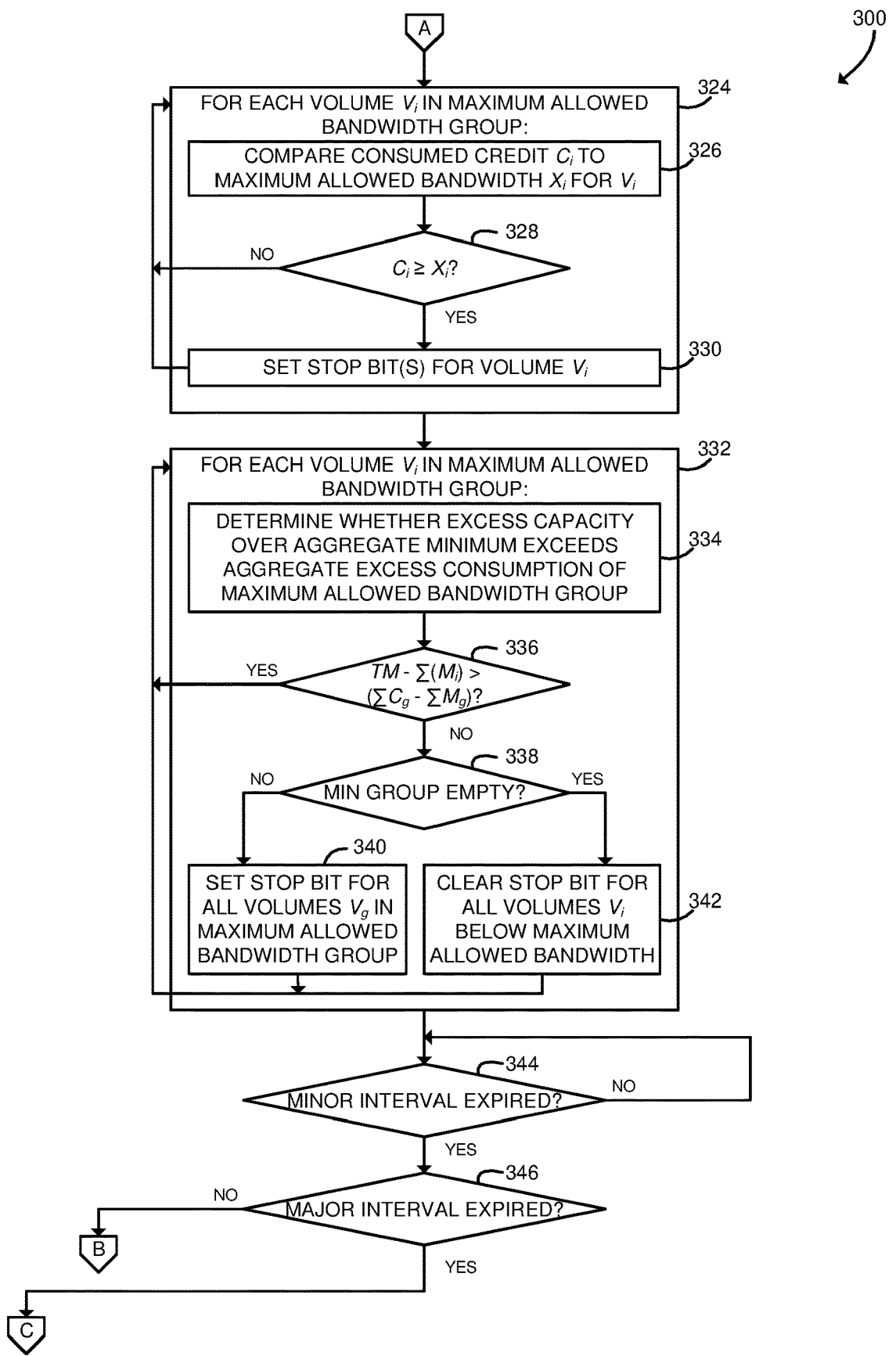

Referring now to FIGS. 3 and 4, in use, the computing device 102 may execute a method 300 for scalable QoS management and enforcement. It should be appreciated that, in some embodiments, the operations of the method 300 may be performed by one or more components of the environment 200 of the computing device 102 as shown in FIG. 2, such as the management thread 202. The method 300 begins with block 302, in which the computing device 102 configures QoS parameters 218 for the logical volumes 224 based on performance characteristics of the underlying base device 128. The computing device 102 may, for example, set a minimum guaranteed bandwidth 220 for each of the logical volumes 224. The minimum guaranteed bandwidth 220 may be zero. The computing device 102 may also set a maximum allowed bandwidth 222 for each of the logical volumes 224. The QoS parameters 218 may be configured by an administrator, a tenant, or other user of the computing device 102. In some embodiments, one or more of the QoS parameters 218 may be dynamically adapted as described below in connection with FIG. 6. As described above, the QoS parameters 218 may be based on or otherwise constrained by performance of the underlying base device 128. For example, the aggregate minimum guaranteed bandwidth 220 of all logical volumes 224 may not exceed the total guaranteed performance of the base device 128. The QoS parameters 218 may be set in terms of I/O credits given in a time interval. The I/O credits may be values that are relative to data bandwidth, I/O operation bandwidth, or other performance characteristics of the base device 128. The available I/O credits for a base device 128 may be determined based on certain ratios of read/write performance in various workloads (e.g., random access, sequential access, etc.). As described further below, the logical volumes 224 consume the I/O credits based on incoming I/O operation type and size.

In block 304, the management thread 202 initializes bandwidth capability groups based on the configured QoS parameters 218. Each group includes or otherwise references the logical volumes 224, and each logical volume 224 is included in exactly one group. The management thread 202 may maintain two bandwidth capability groups: a minimum guaranteed capability group and a maximum allowed capability group. In block 306, the management thread 202 groups logical volumes 224 having a nonzero minimum guaranteed bandwidth 220 into the minimum guaranteed capability group. In block 308, the management thread 202 groups the remaining logical volumes 224 in the maximum allowed capability group. As described further below, the management thread 202 may reset the bandwidth capability groups after every major interval.

In block 310, the management thread 202 clears the stop bits 214 for all logical volumes 224. As described above, each logical volume 224 may be associated with multiple stop bits 214, with each stop bit associated with a processor core 122. Thus, the management thread 202 may clear a stop bit 214 for each combination of processor core 122 and logical volume 224.

In block 312, the management thread 202 reads I/O counters 216 from each processor core 122. As described above, each logical volume 224 may be associated with multiple I/O counters 216, with each I/O counter 216 associated with a processor core 122. The I/O counters 216 may include read counters, write counters, or other indicators of I/O credits that have been consumed by each processor core 122. As described further below, each processor core 122 (executing a worker thread 210) may have exclusive write access to its associated I/O counters 216, and the management thread 202 may read those I/O counters 216. Thus, the management thread 202 and the worker threads 210 may exchange I/O counter data without locks or serialization. In block 314, the management thread 202 aggregates I/O counter 216 data for each logical volume 224. The management thread 202 thus determines I/O credits consumed by all processor cores 122 for each logical volume 224. As described further below, the management thread 202 may read the I/O counters 216 and update the I/O credits after every minor interval (i.e., multiple times per major interval).

In block 316, the management thread 202 moves each logical volume 224 from the minimum guaranteed capability group that has consumed its minimum guaranteed bandwidth 220 to the maximum allowed capability group. To do so, for each logical volume 224 in the minimum guaranteed capability group, in block 318 the management thread 202 compares the I/O credit consumed by that logical volume 224 to the minimum guaranteed bandwidth 220 for that logical volume 224. The management thread 202 may, for example, perform a comparison as shown in Equation 1, below. In Equation 1, $C_i$ is the total bandwidth consumed for a particular logical volume 224 (identified by the subscript i) across all cores 122 and/or worker threads 210 for the current major interval. $M_i$ is the minimum guaranteed bandwidth 220 for that logical volume 224. In block 320, the management thread 202 determines whether the I/O credit consumed is greater than or equal to the minimum guaranteed bandwidth 220. If so, the method 300 advances to block 322, in which the management thread 202 moves the logical volume 224 from the minimum guaranteed capability group to the maximum allowed capability group. The method 300 processes all logical volumes 224 in the minimum guaranteed capability group as shown in block 316. The method 300 then proceeds to block 324, shown in FIG. 4.

$$C_i \geq M_i \quad (1)$$

Referring now to FIG. 4, in block 324 the management thread 202 sets stop bits 214 for each logical volume 224 in the maximum allowed capability group that has met or exceeded its maximum allowed bandwidth 222. To do so, for each logical volume 224 in the maximum allowed capability group, in block 326 the management thread 202 compares the I/O credit consumed by that logical volume 224 to the maximum allowed bandwidth 222 for that logical volume 224. The management thread 202 may, for example, perform a comparison as shown in Equation 2, below. In Equation 2, $C_i$ is the total bandwidth consumed for a particular logical volume 224 (identified by the subscript i) across all cores 122 and/or worker threads 210 for the current major interval. $X_i$ is the maximum allowed bandwidth 222 for that logical volume 224. In block 328, the management thread 202 determines whether the I/O credit consumed is greater than or equal to the maximum allowed bandwidth 222. If so, the method 300 advances to block 330, in which the management thread 202 sets all stop bits 214 associated with the logical volume 224. For example, the management thread 202 may set a stop bit 214 for each core 122 and/or worker thread 210 that may access the logical volume 224. Continuing that example, and referring to FIG. 2, if the logical volume 224x has exceeded the maximum allowed bandwidth 222x, then the management thread 202 may set stop bits 214ax, 214bx associated with the cores 122a, 122b, respectively. As described further below, the cores 122a, 122b will then no longer perform I/O on the logical volume 224x, allowing for QoS enforcement without locking. The method 300 processes all logical volumes 224 in the maximum allowed capability group as shown in block 324. The method 300 then proceeds to block 332.

$$C_i \geq X_i \quad (2)$$

In block 332, the management thread 202 controls I/O operations by the worker threads 210 in order to enforce guaranteed bandwidth minimums and maximums and also allow the worker threads 210 to utilize excess capacity of the underlying base device 128. To do so, for each logical volume 224 of the maximum allowed capability group, in block 334 the management thread determines whether excess bandwidth capacity over the aggregate guaranteed minimum bandwidth exceeds the aggregate excess consumption of the maximum allowed capability group. The management thread 202 may, for example, perform a comparison as shown in Equation 3, below. In Equation 3, TM is the total maximum performance capability of the underlying base device 128. TM may be determined, for example, as the maximum sustained performance capability, maximum guaranteed performance, or other performance characteristic of the physical storage device 128. As described above, $M_i$ is the minimum guaranteed bandwidth 220 for a logical volume 224 identified by the subscript i. Thus, $\Sigma(M_i)$ is the aggregate minimum guaranteed bandwidth for all logical volumes 224, and the expression TM$-\Sigma(M_i)$ is the excess bandwidth capacity over the aggregate guaranteed minimum bandwidth 220. As described above, $C_g$ is the total bandwidth consumed for a particular logical volume 224 (identified by the subscript g) across all cores 122 and/or worker threads 210 for the current major interval. The subscript g indicates inclusion in the maximum allowed capacity group, thus $\Sigma(C_g)$ is aggregate bandwidth consumption of all logical volumes 224 in the maximum allowed capacity group. Similarly, $\Sigma(M_g)$ is the aggregate minimum guaranteed bandwidth 220 of all logical volumes 224 in the maximum allowed capacity group. The expression $\Sigma(C_g)-\Sigma(M_g)$ is the aggregate excess consumption of the maximum allowed capability group. In block 336, the management thread 202 determines whether excess bandwidth capacity over the aggregate guaranteed minimum bandwidth is greater than the aggregate excess consumption of the maximum allowed capability group. If not, the method 300 advances to block 338, in which the management thread 202 determines whether the minimum guaranteed capability group is empty. If not, the method 300 branches to block 340, in which the management thread 202 sets stop bits 214 for all logical volumes 224 that are in the maximum allowed capability group. Thus, those logical volumes 224 in the minimum guaranteed capability group may continue to perform I/O until their associated minimum guaranteed bandwidth 220 is met. Referring back to block 338, if the minimum guaranteed capability group is empty, the method 300 branches to block 342, in which the management thread 202 clears the stop bits 214 for all logical volumes 224 that consumed less than their maximum allowed bandwidth 222. Thus, after minimum guaranteed bandwidth 220 amounts have been satisfied for all logical volumes 224, the volumes 224 may continue to consume capacity of the base device 128 up to their associated maximum allowed bandwidth 222. The method 300 processes all logical volumes 224 in the maximum allowed capability group as shown in block 332. The method 300 then proceeds to block 344.

$$TM - \Sigma(M_i) > \Sigma(C_g) - \Sigma(M_g) \quad (3)$$

In block 344, the management thread 202 determines whether a minor interval has expired. The minor interval may be embodied as a small amount of time, such as one millisecond. In some embodiments, the management thread 202 may poll the I/O counters 216 and thus the minor interval may be zero (i.e., no delay). If the minor interval has not expired, the method 300 loops back to block 344 to continue checking the minor interval. If the minor interval has expired, the method 300 advances to block 346.

In block 346, the management thread 202 determines whether a major interval has expired. The major interval may be embodied as a longer amount of time that includes several minor intervals. For example, the major interval may be 100 milliseconds. The QoS parameters 218 may be defined in terms of the major interval, for example as a particular number of I/O credits per major interval. If the major interval has not expired (i.e., only a minor interval has expired), the method 300 loops back to block 312, shown in FIG. 3, to continue reading the I/O counters 216 and enforcing the QoS parameters 218. If a major interval has expired, the method 300 loops back to block 304, also shown in FIG. 3, to re-initialize the bandwidth capability groups and continue enforcing the QoS parameters 218.

Figure 5:
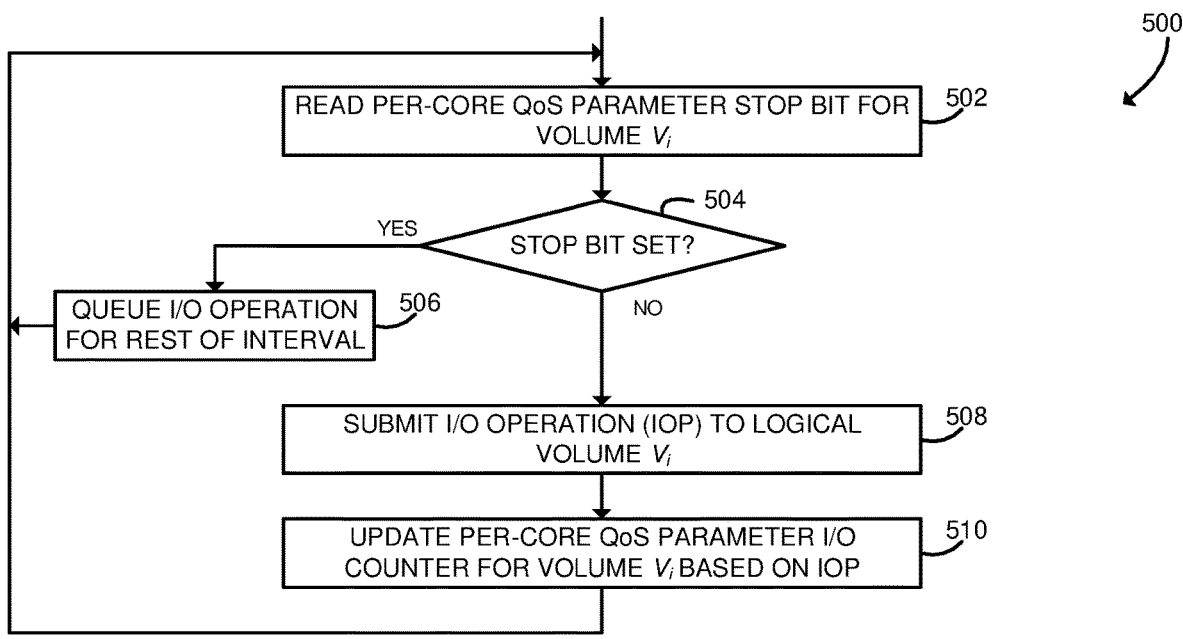
FIG. 5 is a simplified flow diagram of at least one embodiment of a method for lockless QoS enforcement that may be executed by the computing device of FIGS. 1-2.

Referring now to FIG. 5, in use, the computing device 102 may execute a method 500 for scalable QoS management. It should be appreciated that, in some embodiments, the operations of the method 500 may be performed by one or more components of the environment 200 of the computing device 102 as shown in FIG. 2, such as a worker thread 210. The method 500 begins with block 502, in which a worker thread 210 reads a per-core QoS parameter stop bit 214 for a particular logical volume 224. The worker thread 210 may read the stop bit 214 for each logical volume 224 that is involved in a pending I/O operation (IOP). For example, and referring again to FIG. 2, before reading or writing to the logical volume 224x, the worker thread 210a executing on the processor core 122a may read the stop bit 214ax. Similarly, before reading or writing to the logical volume 224x, the worker thread 210b executing on the processor core 122b may read the stop bit 214bx. The stop bit 214 may be read without taking out a lock or performing any other serialization operation.

In block 504, the worker thread 210 determines whether the stop bit 214 is set. If so, the method 500 branches to block 506, in which the worker thread may queue an I/O operation (IOP) for the remainder of the current interval. The IOP may be processed further when the stop bit 214 is cleared (e.g., in subsequent intervals). The worker thread 210 thus does not submit any IOPs to a logical volume 224 while the corresponding stop bit 214 is set. After queuing the IOP, the method 500 loops back to block 502 to continue reading the stop bit 214. Referring back to block 504, if the stop bit 214 is not set, the method 500 advances to block 508.

In block 508, the worker thread 210 submits an I/O operation (IOP) to the logical volume 224. The logical volume 224 performs the IOP using the underlying base device 128. For example, the logical volume 224 may read or write data as specified by the IOP. In block 510, the worker thread 210 updates one or more per-core QoS parameter I/O counters 216 for the logical volume 224 based on the IOP. The I/O counters 216 may include read counters, write counters, combined bandwidth counters, or other counters that measure bandwidth consumed by the logical volume 224. The updated value of the I/O counter may depend on the type and/or content of the IOP, for example whether the IOP is a read or a write, the size or amount of data involved in the IOP, or other factors. Similar to the stop bits 214, each I/O counter 216 may be associated with a particular worker thread 210 and a particular logical volume 224. For example, and referring again to FIG. 2, after performing an IOP with the logical volume 224x, the worker thread 210a executing on the processor core 122a may update the I/O counter 216ax. Similarly, after performing an IOP with the logical volume 224x, the worker thread 210b executing on the processor core 122b may update the I/O counter 216bx. The I/O counter 216 may be updated without taking out a lock or performing any other serialization operation. After updating the I/O counter 216, the method 500 loops back to block 502 to continue performing IOPs.

Figure 6:
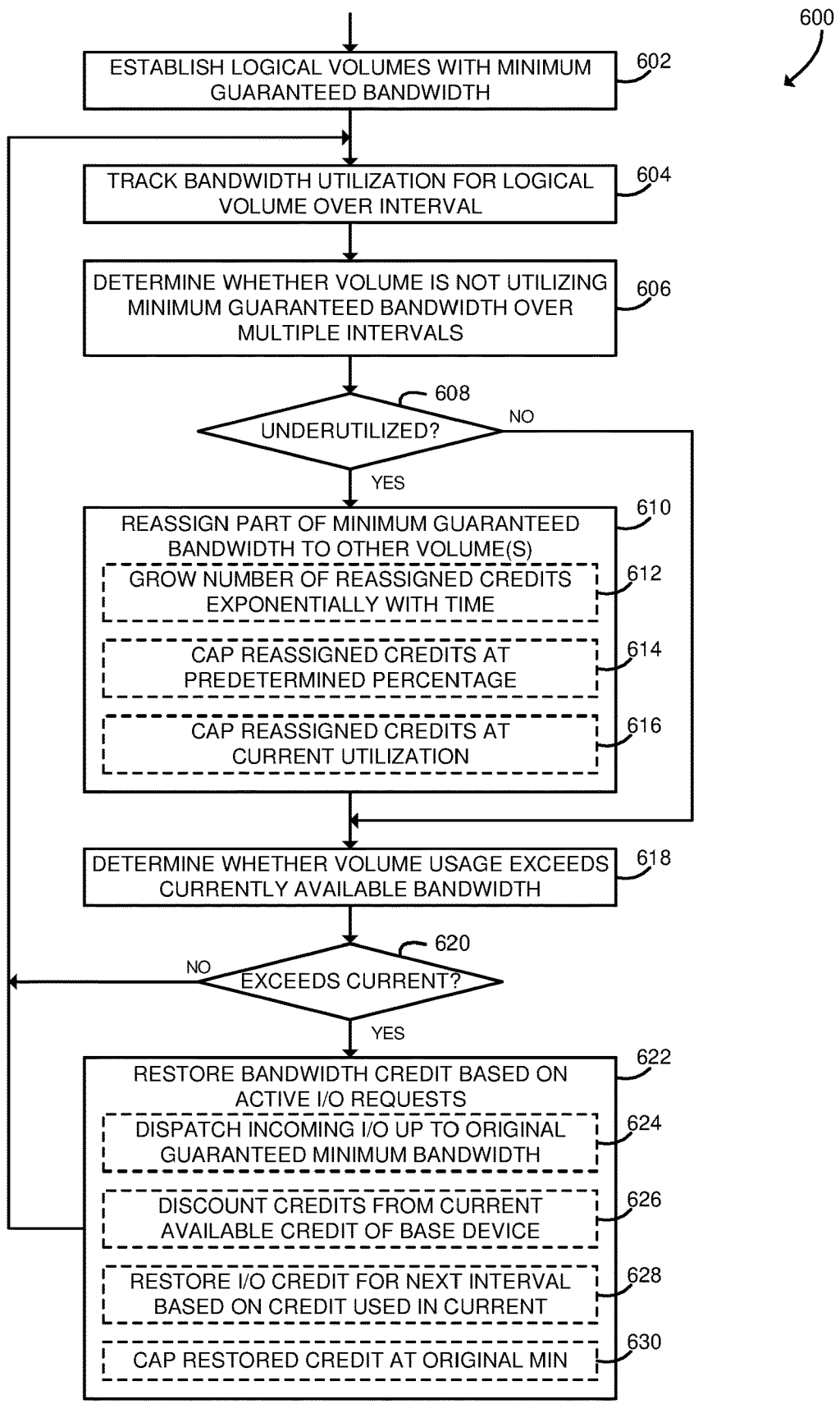
FIG. 6 is a simplified flow diagram of at least one embodiment of a method for adaptive QoS management that may be executed by the computing device of FIGS. 1-2.

Referring now to FIG. 6, in use, the computing device 102 may execute a method 600 for adaptive QoS management. It should be appreciated that, in some embodiments, the operations of the method 600 may be performed by one or more components of the environment 200 of the computing device 102 as shown in FIG. 2, such as the management thread 202. For example, the method 600 may be executed in parallel with or otherwise in conjunction with the method 300 of FIGS. 3 and 4. The method 600 begins with block 602, in which the computing device establishes one or more logical volumes 224 with nonzero minimum guaranteed bandwidth 220. As described above, the minimum guaranteed bandwidth 220 may be set in terms of I/O credits given in a time interval. The I/O credits may be values that are relative to data bandwidth, I/O operation bandwidth, or other performance characteristics of a base device 128 underlying the logical volume 224.

In block 604, the computing device 102 tracks bandwidth utilization for a logical volume 224 over a predetermined interval, such as a major interval as described above in connection with FIGS. 3 and 4. The computing device 102 may track bandwidth utilization, for example, by reading one or more I/O counters 216 that are updated based on IOPs performed by the logical volume 224.

In block 606, the computing device 102 determines whether the logical volume 224 is not utilizing its entire minimum guaranteed bandwidth 220 over multiple intervals. The computing device 102 may, for example, determine whether the consumed bandwidth is less than the minimum guaranteed bandwidth 220 for a predetermined number of intervals. In block 608, the computing device 102 checks whether the logical volume 224 is underutilizing its minimum guaranteed bandwidth 220. If not, the method 600 branches ahead to block 618, described below. If the bandwidth is underutilized, the method 600 advances to block 610.

In block 610, the computing device 102 reassigns part of the minimum guaranteed bandwidth 220 of the logical volume 224 to one or more other logical volumes 224. For example, the computing device 102 may reduce the minimum guaranteed bandwidth 220 value used by the QoS method 300 as described above in connection with FIGS. 3 and 4. The computing device 102 may reduce the minimum guaranteed bandwidth 220 of the logical volume 224 gradually. In some embodiments, in block 612, the computing device 102 may grow the number of credits reassigned to other logical volumes 224 exponentially with time. In some embodiments, in block 614 the computing device 102 may cap the number of reassigned credits at a predetermined percentage of the original minimum guaranteed bandwidth 220. For example, the computing device 102 may reduce the minimum guaranteed bandwidth 220 by a number of credits determined using Equation 4, below. In some embodiments, in block 616, the computing device 102 may cap the reassigned credits at a predetermined minimum bandwidth balance for each logical volume. For example, in those embodiments the inequality shown in Equation 5, below, may always be true.

NumCreditsToReduce=power(2,TimeInterval)*(PercentageTotalVolumeCredits)  (4)

(Current Volume Credit−NumCreditsToReduce)≥MinimumDefinedCredit  (5)

In block 618, the computing device 102 determines whether the bandwidth usage of a logical volume 224 meets or exceeds the currently available bandwidth. For example, the computing device 102 may compare the bandwidth usage to the original minimum guaranteed bandwidth 220 of the logical volume 224 less any part that was reassigned as described above in connection with block 610. In block 620, the computing device 102 checks whether the bandwidth usage of a logical volume 224 meets or exceeds the currently available bandwidth. If not, the method 600 loops back to block 604 to continue tracking bandwidth usage. If the bandwidth usage meets or exceeds the currently available bandwidth, the method 600 advances to block 622.

In block 622, the computing device 102 restores part or all of the bandwidth credit to the logical volume 224 that was previously reassigned to other logical volumes 224 based on active I/O requests. For example, the computing device 102 may increase the minimum guaranteed bandwidth 220 value used by the QoS method 300 as described above in connection with FIGS. 3 and 4. In some embodiments, in block 624, the computing device 102 may dispatch incoming I/O requests up to the original guaranteed minimum bandwidth 220 of the logical volume 224. In some embodiments, in block 626 the restored credits are discounted from the currently available credit of the base device 128 underlying the logical volume 224. In some embodiments, in block 628, if I/O credit is not available, then this results in outstanding I/O requests for QoS tracking, and the I/O credit will be discounted in the next time interval. In some embodiments, in block 630 the I/O credit in subsequent time intervals may be restored back to at least the consumption level of the current interval, and the amount restored maxes out at the original guaranteed minimum bandwidth 220 of the logical volume 224. Thus, I/O ramp up is performed based on the speed/volume of I/O workload. Accordingly, the computing device 102 may ramp up minimum bandwidth quickly to support burst I/O scenarios. After restoring credit, the method 600 loops back to block 604 to continue tracking bandwidth usage.

Figure 7:
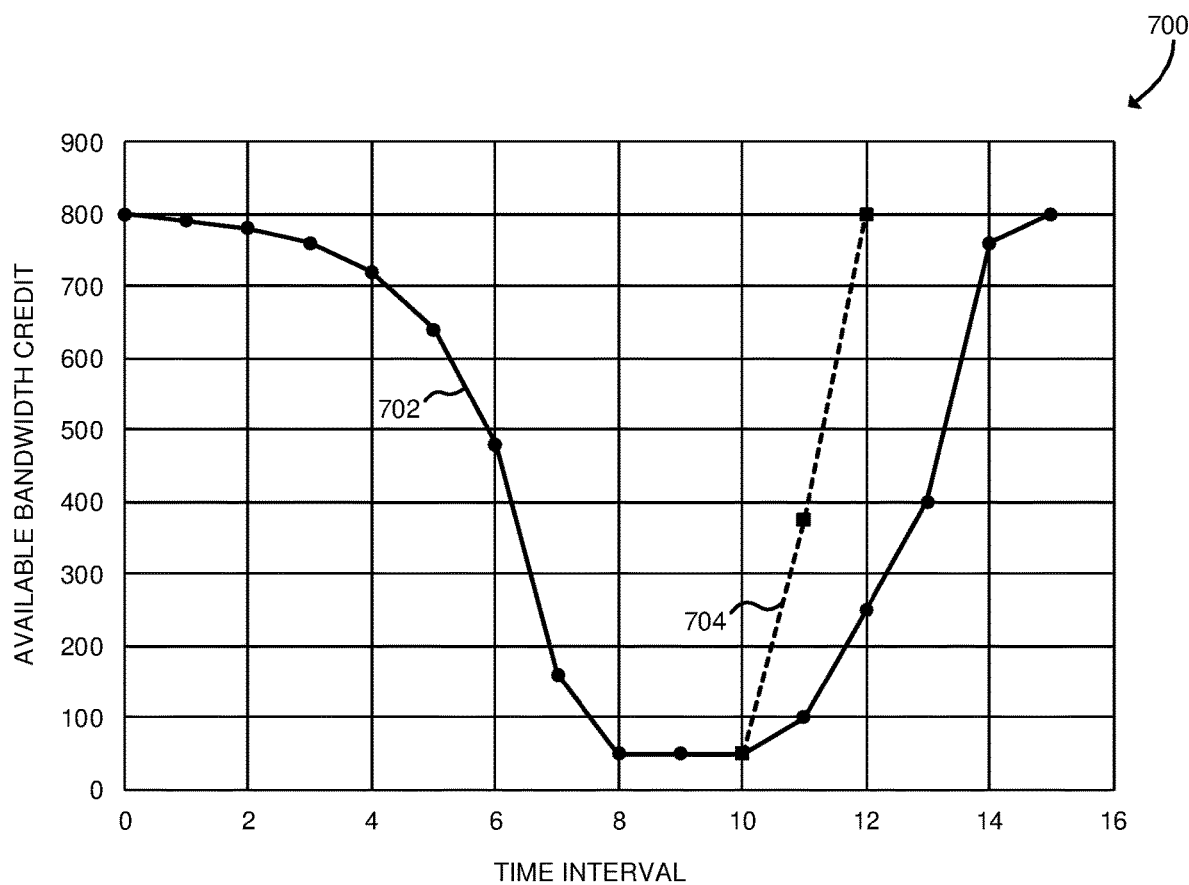
FIG. 7 is a chart illustrating available bandwidth credit with adaptive QoS management.

Referring now to FIG. 7, diagram 700 illustrates available bandwidth credits for a logical volume 224 over time for various illustrative scenarios. As illustrated by curve 702, at time interval zero, available credit is 800, which may correspond to the minimum guaranteed bandwidth 220 of the logical volume 224. As shown, from time interval zero to time interval eight, the available credit is gradually reduced from 800 to 50. This corresponds to an exponential back-off as described above in connection with FIG. 6. In the illustrative example, 750 I/O credits are available for use by other logical volumes 224. As shown, from time interval eight to time interval 10, the available credits remain at 50, which may be the predetermined minimum bandwidth balance for the logical volume 224. As shown, from time interval 10 to time interval 15, the available bandwidth is relatively gradually increased from 50 back to 800. As described above, the increase is based on incoming I/O operations and thus allows the logical volume 224 to process incoming I/O operations while still allowing other volumes 224 to use unused credits. The diagram 700 also includes curve 704, which illustrates a faster ramp-up from 50 credits to 800 credits from time interval 10 to time interval 12. The curve 704 may, for example, represent a faster response to a burst of I/O traffic.

It should be appreciated that, in some embodiments, the methods 300, 500, and/or 600 may be embodied as various instructions stored on a computer-readable media, which may be executed by the processor 120, the I/O subsystem 124, the data storage devices 128, peripheral devices 132, and/or other components of the computing device 102 to cause the computing device 102 to perform the respective method 300, 500, and/or 600. The computer-readable media may be embodied as any type of media capable of being read by the computing device 102 including, but not limited to, the memory 126, the data storage device 128, firmware devices, other memory or data storage devices of the computing device 102, portable media readable by a peripheral device 132 of the computing device 102, and/or other media.

EXAMPLES

Illustrative examples of the technologies disclosed herein are provided below. An embodiment of the technologies may include any one or more, and any combination of, the examples described below.

Example 1 includes a computing device for scalable quality of service (QoS) for storage volumes, the computing device comprising: a QoS monitor to read, by a management thread, a plurality of I/O counters, wherein each I/O counter is associated with a logical volume of a plurality of logical volumes and a processor core of a plurality of processor cores; and a QoS controller to configure, by the management thread, a plurality of stop bits as a function of the plurality of I/O counters and a plurality of QoS parameters, wherein each stop bit is associated with a logical volume and a processor core of the computing device, and wherein the plurality of QoS parameters include a minimum guaranteed bandwidth and an optional maximum allowed bandwidth associated with each logical volume.

Example 2 includes the subject matter of Example 1, and further comprising a workload manager to: determine, by a worker thread executed by a first processor core of the computing device, whether a first stop bit associated with a first logical volume and the first processor core is set; access, by the worker thread, the first logical volume in response to a determination that the first stop bit is not set; and update, by the worker thread, a first I/O counter associated with the first logical volume and the first processor core in response to an access of the first logical volume.

Example 3 includes the subject matter of any of Examples 1 and 2, and wherein the QoS controller is further to: perform, by the management thread, a first set of operations at every major interval, wherein the QoS parameters are in terms of bandwidth credits per major interval; and perform, by the management thread, a second set of operations at every minor interval, wherein the minor interval is less than the major interval, and wherein to perform the second set of operations comprises to read the plurality of I/O counters and to configure the plurality of stop bits.

Example 4 includes the subject matter of any of Examples 1-3, and wherein to perform the first set of operations comprises to: group each logical volume having a nonzero minimum guaranteed bandwidth into a first group; group each logical volume having zero minimum guaranteed bandwidth into a second group; and clear each of the plurality of stop bits.

Example 5 includes the subject matter of any of Examples 1-4, and wherein to perform the second set of operations further comprises to move each logical volume of the first group that has consumed its associated minimum guaranteed bandwidth to the second group.

Example 6 includes the subject matter of any of Examples 1-5, and wherein to move each logical volume of the first group that has consumed its associated minimum guaranteed bandwidth to the second group comprises to: determine, for each logical volume in the first group, a consumed bandwidth credit in response to reading a plurality of I/O counters that are each associated with the logical volume; determine, for each logical volume in the first group, whether the consumed bandwidth credit is greater than or equal to a minimum guaranteed bandwidth associated with the logical volume; and move, for each logical volume of the first group, the logical volume to the second group in response to determining that the consumed bandwidth credit is greater than or equal to the minimum guaranteed bandwidth associated with the logical volume.

Example 7 includes the subject matter of any of Examples 1-6, and wherein to perform the second set of operations further comprises to set a stop bit associated with each volume of the second group that has consumed its associated maximum allowed bandwidth.

Example 8 includes the subject matter of any of Examples 1-7, and wherein to set the stop bit associated with each volume of the second group that has consumed its associated maximum allowed bandwidth comprises to: determine, for each logical volume in the second group, a consumed bandwidth credit in response to reading of a plurality of I/O counters that are each associated with the logical volume; determine, for each logical volume in the second group, whether the consumed bandwidth credit is greater than or equal to a maximum allowed bandwidth associated with the logical volume; and set, for each logical volume in the second group, a plurality of stop bits in response to a determination that the consumed bandwidth credit is greater than or equal to the maximum allowed bandwidth associated with the logical volume, wherein the plurality of stop bits are each associated with the logical volume.

Example 9 includes the subject matter of any of Examples 1-8, and wherein to perform the second set of operations further comprises to: determine whether an excess capacity over an aggregate minimum guaranteed bandwidth exceeds an aggregate excess consumption of the second group; determine whether the first group is empty in response to a determination that the excess capacity over the aggregate minimum guaranteed bandwidth exceeds the aggregate excess consumption of the second group; set the stop bit associated with each volume of the second group in response to a determination that the first group is not empty; and clear the stop bit associated with each volume that has not consumed its associated maximum allowed bandwidth in response to a determination that the first group is empty.

Example 10 includes the subject matter of any of Examples 1-9, and wherein to determine whether an excess capacity over an aggregate minimum guaranteed bandwidth exceeds an aggregate excess consumption of the second group comprises to: determine a total maximum performance capability based on a physical storage volume; determine the aggregate minimum guaranteed bandwidth of all of the logical volumes; determine the excess capacity as a difference between the total maximum performance capability and the aggregate minimum guaranteed bandwidth; determine a total credits consumed by all logical volumes in the second group; determine an aggregate minimum guaranteed bandwidth of all of the logical volumes in the second group; and determine the aggregate excess consumption as a difference between the total credits consumed by all logical volumes in the second group and the aggregate minimum guaranteed bandwidth of all of the logical volumes in the second group.

Example 11 includes the subject matter of any of Examples 1-10, and further comprising a QoS adapter to: determine whether a first logical volume having a first minimum guaranteed bandwidth that is nonzero has consumed less than the first minimum guaranteed bandwidth; and reassign a first part of the first minimum guaranteed bandwidth to one or more other logical volumes in response to a determination that the first logical volume has consumed less than the first minimum guaranteed bandwidth.

Example 12 includes the subject matter of any of Examples 1-11, and wherein to determine whether the first logical volume has consumed less than the first minimum guaranteed bandwidth comprises to determine whether the first logical volume has consumed less than the first minimum guaranteed bandwidth over a predetermined number of intervals.

Example 13 includes the subject matter of any of Examples 1-12, and wherein to reassign the first part of the first minimum guaranteed bandwidth to the one or more other logical volumes comprises to grow the first part of the first minimum guaranteed bandwidth exponentially with time.

Example 14 includes the subject matter of any of Examples 1-13, and wherein to reassign the first part of the first minimum guaranteed bandwidth to the one or more other logical volumes comprises to cap the first part at a predetermined percentage of the first minimum guaranteed bandwidth.

Example 15 includes the subject matter of any of Examples 1-14, and wherein to reassign the first part of the minimum guaranteed bandwidth to the one or more other logical volumes comprises to cap the first part at a current underutilization of the logical volume.

Example 16 includes the subject matter of any of Examples 1-15, and wherein the QoS adapter is further to: determine whether a current usage of the first logical volume exceeds currently available bandwidth in response to reassignment of the first part of the first minimum guaranteed bandwidth; and restore bandwidth credit to the first logical volume up to the first minimum guaranteed bandwidth in response to a determination that the current usage of the first logical volume exceeds the currently available bandwidth.

Example 17 includes the subject matter of any of Examples 1-16, and wherein to restore the bandwidth credit to the first logical volume comprises to dispatch incoming I/O operations to the first logical volume up to the first minimum guaranteed bandwidth.

Example 18 includes the subject matter of any of Examples 1-17, and wherein to restore the bandwidth credit to the first logical volume comprises to restore bandwidth credit for a next interval based on a credit used by the first logical volume in a current interval.

Example 19 includes the subject matter of any of Examples 1-18, and wherein the minimum guaranteed bandwidth comprises an amount of storage I/O data per time.

Example 20 includes the subject matter of any of Examples 1-19, and wherein the minimum guaranteed bandwidth comprises an amount of I/O operations per time.

Example 21 includes a method for scalable quality of service (QoS) for storage volumes, the method comprising: reading, by a management thread executed by the computing device, a plurality of I/O counters, wherein each I/O counter is associated with a logical volume of a plurality of logical volumes and a processor core of a plurality of processor cores of the computing device; and configuring, by the management thread, a plurality of stop bits as a function of the plurality of I/O counters and a plurality of QoS parameters, wherein each stop bit is associated with a logical volume and a processor core of the computing device, and wherein the plurality of QoS parameters include a minimum guaranteed bandwidth and an optional maximum allowed bandwidth associated with each logical volume.

Example 22 includes the subject matter of Example 21, and further comprising: determining, by a worker thread executed by a first processor core of the computing device, whether a first stop bit associated with a first logical volume and the first processor core is set; accessing, by the worker thread, the first logical volume in response to determining that the first stop bit is not set; and updating, by the worker thread, a first I/O counter associated with the first logical volume and the first processor core in response to accessing the first logical volume.

Example 23 includes the subject matter of any of Examples 21 and 22, and further comprising: performing, by the management thread, a first set of operations at every major interval, wherein the QoS parameters are in terms of bandwidth credits per major interval; and performing, by the management thread, a second set of operations at every minor interval, wherein the minor interval is less than the major interval, and wherein performing the second set of operations comprises reading the plurality of I/O counters and configuring the plurality of stop bits.

Example 24 includes the subject matter of any of Examples 21-23, and wherein performing the first set of operations comprises: grouping each logical volume having a nonzero minimum guaranteed bandwidth into a first group; grouping each logical volume having zero minimum guaranteed bandwidth into a second group; and clearing each of the plurality of stop bits.

Example 25 includes the subject matter of any of Examples 21-24, and wherein performing the second set of operations further comprises moving each logical volume of the first group that has consumed its associated minimum guaranteed bandwidth to the second group.

Example 26 includes the subject matter of any of Examples 21-25, and wherein moving each logical volume of the first group that has consumed its associated minimum guaranteed bandwidth to the second group comprises: determining, for each logical volume in the first group, a consumed bandwidth credit in response to reading a plurality of I/O counters that are each associated with the logical volume; determining, for each logical volume in the first group, whether the consumed bandwidth credit is greater than or equal to a minimum guaranteed bandwidth associated with the logical volume; and moving, for each logical volume of the first group, the logical volume to the second group in response to determining that the consumed bandwidth credit is greater than or equal to the minimum guaranteed bandwidth associated with the logical volume.

Example 27 includes the subject matter of any of Examples 21-26, and wherein performing the second set of operations further comprises setting a stop bit associated with each volume of the second group that has consumed its associated maximum allowed bandwidth.

Example 28 includes the subject matter of any of Examples 21-27, and wherein setting the stop bit associated with each volume of the second group that has consumed its associated maximum allowed bandwidth comprises: determining, for each logical volume in the second group, a consumed bandwidth credit in response to reading a plurality of I/O counters that are each associated with the logical volume; determining, for each logical volume in the second group, whether the consumed bandwidth credit is greater than or equal to a maximum allowed bandwidth associated with the logical volume; and setting, for each logical volume in the second group, a plurality of stop bits in response to determining that the consumed bandwidth credit is greater than or equal to the maximum allowed bandwidth associated with the logical volume, wherein the plurality of stop bits are each associated with the logical volume.

Example 29 includes the subject matter of any of Examples 21-28, and wherein performing the second set of operations further comprises: determining whether an excess capacity over an aggregate minimum guaranteed bandwidth exceeds an aggregate excess consumption of the second group; determining whether the first group is empty in response to determining that the excess capacity over the aggregate minimum guaranteed bandwidth exceeds the aggregate excess consumption of the second group; setting the stop bit associated with each volume of the second group in response to determining that the first group is not empty; and clearing the stop bit associated with each volume that has not consumed its associated maximum allowed bandwidth in response to determining that the first group is empty.

Example 30 includes the subject matter of any of Examples 21-29, and wherein determining whether an excess capacity over an aggregate minimum guaranteed bandwidth exceeds an aggregate excess consumption of the second group comprises: determining a total maximum performance capability based on a physical storage volume; determining the aggregate minimum guaranteed bandwidth of all of the logical volumes; determining the excess capacity as a difference between the total maximum performance capability and the aggregate minimum guaranteed bandwidth; determining a total credits consumed by all logical volumes in the second group; determining an aggregate minimum guaranteed bandwidth of all of the logical volumes in the second group; and determining the aggregate excess consumption as a difference between the total credits consumed by all logical volumes in the second group and the aggregate minimum guaranteed bandwidth of all of the logical volumes in the second group.

Example 31 includes the subject matter of any of Examples 21-30, and further comprising: determining, by the computing device, whether a first logical volume having a first minimum guaranteed bandwidth that is nonzero has consumed less than the first minimum guaranteed bandwidth; and reassigning, by the computing device, a first part of the first minimum guaranteed bandwidth to one or more other logical volumes in response to determining that the first logical volume has consumed less than the first minimum guaranteed bandwidth.

Example 32 includes the subject matter of any of Examples 21-31, and wherein determining whether the first logical volume has consumed less than the first minimum guaranteed bandwidth comprises determining whether the first logical volume has consumed less than the first minimum guaranteed bandwidth over a predetermined number of intervals.

Example 33 includes the subject matter of any of Examples 21-32, and wherein reassigning the first part of the first minimum guaranteed bandwidth to the one or more other logical volumes comprises growing the first part of the first minimum guaranteed bandwidth exponentially with time.

Example 34 includes the subject matter of any of Examples 21-33, and wherein reassigning the first part of the first minimum guaranteed bandwidth to the one or more other logical volumes comprises capping the first part at a predetermined percentage of the first minimum guaranteed bandwidth.

Example 35 includes the subject matter of any of Examples 21-34, and wherein reassigning the first part of the minimum guaranteed bandwidth to the one or more other logical volumes comprises capping the first part at a current underutilization of the logical volume.

Example 36 includes the subject matter of any of Examples 21-35, and further comprising: determining, by the computing device, whether a current usage of the first logical volume exceeds currently available bandwidth in response to reassigning the first part of the first minimum guaranteed bandwidth; and restoring, by the computing device, bandwidth credit to the first logical volume up to the first minimum guaranteed bandwidth in response to determining that the current usage of the first logical volume exceeds the currently available bandwidth.

Example 37 includes the subject matter of any of Examples 21-36, and wherein restoring the bandwidth credit to the first logical volume comprises dispatching incoming I/O operations to the first logical volume up to the first minimum guaranteed bandwidth.

Example 38 includes the subject matter of any of Examples 21-37, and wherein restoring the bandwidth credit to the first logical volume comprises restoring bandwidth credit for a next interval based on a credit used by the first logical volume in a current interval.

Example 39 includes the subject matter of any of Examples 21-38, and wherein the minimum guaranteed bandwidth comprises an amount of storage I/O data per time.

Example 40 includes the subject matter of any of Examples 21-39, and wherein the minimum guaranteed bandwidth comprises an amount of I/O operations per time.

Example 41 includes a computing device comprising: a processor; and a memory having stored therein a plurality of instructions that when executed by the processor cause the computing device to perform the method of any of Examples 21-40.

Examples 42 includes one or more non-transitory, computer readable storage media comprising a plurality of instructions stored thereon that in response to being executed result in a computing device performing the method of any of Examples 21-40.

Example 43 includes a computing device comprising means for performing the method of any of Examples 21-40.

The invention claimed is:

1. One or more non-transitory computer-readable storage media comprising a plurality of instructions stored thereon that, in response to being executed, cause a computing device to:
   read, by a management thread, a plurality of I/O counters, wherein each I/O counter is associated with a logical volume of a plurality of logical volumes and a processor core of a plurality of processor cores of the computing device; and
   configure, by the management thread, a plurality of stop bits as a function of the plurality of I/O counters and a plurality of QoS parameters, wherein each stop bit is associated with a logical volume and a processor core of the computing device, and wherein the plurality of QoS parameters include a minimum guaranteed bandwidth and an optional maximum allowed bandwidth associated with each logical volume.

2. The one or more non-transitory computer-readable storage media of claim 1, further comprising a plurality of instructions stored thereon that, in response to being executed, cause the computing device to:
   determine, by a worker thread executed by a first processor core, whether a first stop bit associated with a first logical volume and the first processor core is set;
   access, by the worker thread, the first logical volume in response to determining that the first stop bit is not set; and
   update, by the worker thread, a first I/O counter associated with the first logical volume and the first processor core in response to accessing the first logical volume.

3. The one or more non-transitory computer-readable storage media of claim 1, further comprising a plurality of instructions stored thereon that, in response to being executed, cause the computing device to:
   perform, by the management thread, a first set of operations at every major interval, wherein the QoS parameters are in terms of bandwidth credits per major interval; and
   perform, by the management thread, a second set of operations at every minor interval, wherein the minor interval is less than the major interval, and wherein performing the second set of operations comprises reading the plurality of I/O counters and configuring the plurality of stop bits.

4. The one or more non-transitory computer-readable storage media of claim 3, wherein to perform the first set of operations comprises to:
   group each logical volume having a nonzero minimum guaranteed bandwidth into a first group;
   group each logical volume having zero minimum guaranteed bandwidth into a second group; and
   clear each of the plurality of stop bits.

5. The one or more non-transitory computer-readable storage media of claim 4, wherein to perform the second set of operations further comprises to move each logical volume of the first group that has consumed its associated minimum guaranteed bandwidth to the second group.

6. The one or more non-transitory computer-readable storage media of claim 5, wherein to move each logical volume of the first group that has consumed its associated minimum guaranteed bandwidth to the second group comprises to:
   determine, for each logical volume in the first group, a consumed bandwidth credit in response to reading a plurality of I/O counters that are each associated with the logical volume;
   determine, for each logical volume in the first group, whether the consumed bandwidth credit is greater than or equal to a minimum guaranteed bandwidth associated with the logical volume; and
   move, for each logical volume of the first group, the logical volume to the second group in response to determining that the consumed bandwidth credit is greater than or equal to the minimum guaranteed bandwidth associated with the logical volume.

7. The one or more non-transitory computer-readable storage media of claim 5, wherein to perform the second set of operations further comprises to set a stop bit associated with each volume of the second group that has consumed its associated maximum allowed bandwidth.

8. The one or more non-transitory computer-readable storage media of claim 7, wherein to set the stop bit associated with each volume of the second group that has consumed its associated maximum allowed bandwidth comprises to:
   determine, for each logical volume in the second group, a consumed bandwidth credit in response to reading a plurality of I/O counters that are each associated with the logical volume;
   determine, for each logical volume in the second group, whether the consumed bandwidth credit is greater than or equal to a maximum allowed bandwidth associated with the logical volume; and
   set, for each logical volume in the second group, a plurality of stop bits in response to determining that the consumed bandwidth credit is greater than or equal to the maximum allowed bandwidth associated with the logical volume, wherein the plurality of stop bits are each associated with the logical volume.

9. The one or more non-transitory computer-readable storage media of claim 7, wherein to perform the second set of operations further comprises to:
   determine whether an excess capacity over an aggregate minimum guaranteed bandwidth exceeds an aggregate excess consumption of the second group;
   determine whether the first group is empty in response to determining that the excess capacity over the aggregate minimum guaranteed bandwidth exceeds the aggregate excess consumption of the second group;
   set the stop bit associated with each volume of the second group in response to determining that the first group is not empty; and
   clear the stop bit associated with each volume that has not consumed its associated maximum allowed bandwidth in response to determining that the first group is empty.

10. The one or more non-transitory computer-readable storage media of claim 9, wherein to determine whether an excess capacity over an aggregate minimum guaranteed bandwidth exceeds an aggregate excess consumption of the second group comprises to:
   determine a total maximum performance capability based on a physical storage volume;
   determine the aggregate minimum guaranteed bandwidth of all of the logical volumes;
   determine the excess capacity as a difference between the total maximum performance capability and the aggregate minimum guaranteed bandwidth;
   determine a total credits consumed by all logical volumes in the second group;
   determine an aggregate minimum guaranteed bandwidth of all of the logical volumes in the second group; and
   determine the aggregate excess consumption as a difference between the total credits consumed by all logical volumes in the second group and the aggregate minimum guaranteed bandwidth of all of the logical volumes in the second group.

11. The one or more non-transitory computer-readable storage media of claim 1, further comprising a plurality of instructions stored thereon that, in response to being executed, cause the computing device to:
   determine whether a first logical volume having a first minimum guaranteed bandwidth that is nonzero has consumed less than the first minimum guaranteed bandwidth; and
   reassign a first part of the first minimum guaranteed bandwidth to one or more other logical volumes in response to determining that the first logical volume has consumed less than the first minimum guaranteed bandwidth.

12. The one or more non-transitory computer-readable storage media of claim 11, wherein to reassign the first part of the first minimum guaranteed bandwidth to the one or more other logical volumes comprises to grow the first part of the first minimum guaranteed bandwidth exponentially with time.

13. The one or more non-transitory computer-readable storage media of claim 11, further comprising a plurality of instructions stored thereon that, in response to being executed, cause the computing device to:
   determine whether a current usage of the first logical volume exceeds currently available bandwidth in response to reassigning the first part of the first minimum guaranteed bandwidth; and
   restore bandwidth credit to the first logical volume up to the first minimum guaranteed bandwidth in response to determining that the current usage of the first logical volume exceeds the currently available bandwidth.

14. A computing device for scalable quality of service (QoS) for storage volumes, the computing device comprising:
   a QoS monitor to read, by a management thread, a plurality of I/O counters, wherein each I/O counter is associated with a logical volume of a plurality of logical volumes and a processor core of a plurality of processor cores; and
   a QoS controller to configure, by the management thread, a plurality of stop bits as a function of the plurality of I/O counters and a plurality of QoS parameters, wherein each stop bit is associated with a logical volume and a processor core of the computing device, and wherein the plurality of QoS parameters include a minimum guaranteed bandwidth and an optional maximum allowed bandwidth associated with each logical volume.

15. The computing device of claim 14, further comprising a workload manager to:
  determine, by a worker thread executed by a first processor core of the computing device, whether a first stop bit associated with a first logical volume and the first processor core is set;
  access, by the worker thread, the first logical volume in response to a determination that the first stop bit is not set; and
  update, by the worker thread, a first I/O counter associated with the first logical volume and the first processor core in response to an access of the first logical volume.

16. The computing device of claim 14, wherein the QoS controller is further to:
  perform, by the management thread, a first set of operations at every major interval, wherein the QoS parameters are in terms of bandwidth credits per major interval; and
  perform, by the management thread, a second set of operations at every minor interval, wherein the minor interval is less than the major interval, and wherein to perform the second set of operations comprises to read the plurality of I/O counters and to configure the plurality of stop bits;
  wherein to perform the first set of operations comprises to:
    group each logical volume having a nonzero minimum guaranteed bandwidth into a first group;
    group each logical volume having zero minimum guaranteed bandwidth into a second group; and
    clear each of the plurality of stop bits; and
  wherein to perform the second set of operations further comprises to:
    move each logical volume of the first group that has consumed its associated minimum guaranteed bandwidth to the second group; and
    set a stop bit associated with each volume of the second group that has consumed its associated maximum allowed bandwidth.

17. The computing device of claim 16, wherein to perform the second set of operations further comprises to:
  determine whether an excess capacity over an aggregate minimum guaranteed bandwidth exceeds an aggregate excess consumption of the second group;
  determine whether the first group is empty in response to a determination that the excess capacity over the aggregate minimum guaranteed bandwidth exceeds the aggregate excess consumption of the second group;
  set the stop bit associated with each volume of the second group in response to a determination that the first group is not empty; and
  clear the stop bit associated with each volume that has not consumed its associated maximum allowed bandwidth in response to a determination that the first group is empty.

18. The computing device of claim 14, further comprising a QoS adapter to:
  determine whether a first logical volume having a first minimum guaranteed bandwidth that is nonzero has consumed less than the first minimum guaranteed bandwidth; and
  reassign a first part of the first minimum guaranteed bandwidth to one or more other logical volumes in response to a determination that the first logical volume has consumed less than the first minimum guaranteed bandwidth.

19. The computing device of claim 18, wherein the QoS adapter is further to:
  determine whether a current usage of the first logical volume exceeds currently available bandwidth in response to reassignment of the first part of the first minimum guaranteed bandwidth; and
  restore bandwidth credit to the first logical volume up to the first minimum guaranteed bandwidth in response to a determination that the current usage of the first logical volume exceeds the currently available bandwidth.

20. A method for scalable quality of service (QoS) for storage volumes, the method comprising:
  reading, by a management thread executed by a computing device, a plurality of I/O counters, wherein each I/O counter is associated with a logical volume of a plurality of logical volumes and a processor core of a plurality of processor cores of the computing device, and wherein the plurality of logical volumes are backed by a physical storage volume; and
  configuring, by the management thread, a plurality of stop bits as a function of the plurality of I/O counters and a plurality of QoS parameters, wherein each stop bit is associated with a logical volume and a processor core of the computing device, and wherein the plurality of QoS parameters include a minimum guaranteed bandwidth and an optional maximum allowed bandwidth associated with each logical volume.

21. The method of claim 20, further comprising:
  determining, by a worker thread executed by a first processor core of the computing device, whether a first stop bit associated with a first logical volume and the first processor core is set;
  accessing, by the worker thread, the first logical volume in response to determining that the first stop bit is not set; and
  updating, by the worker thread, a first I/O counter associated with the first logical volume and the first processor core in response to accessing the first logical volume.

22. The method of claim 20, further comprising:
  performing, by the management thread, a first set of operations at every major interval, wherein the QoS parameters are in terms of bandwidth credits per major interval; and
  performing, by the management thread, a second set of operations at every minor interval, wherein the minor interval is less than the major interval, and wherein performing the second set of operations comprises reading the plurality of I/O counters and configuring the plurality of stop bits;
  wherein performing the first set of operations comprises:
    grouping each logical volume having a nonzero minimum guaranteed bandwidth into a first group;
    grouping each logical volume having zero minimum guaranteed bandwidth into a second group; and
    clearing each of the plurality of stop bits; and
  wherein performing the second set of operations further comprises:
    moving each logical volume of the first group that has consumed its associated minimum guaranteed bandwidth to the second group; and
    setting a stop bit associated with each volume of the second group that has consumed its associated maximum allowed bandwidth.

23. The method of claim 22, wherein performing the second set of operations further comprises:
- determining whether an excess capacity over an aggregate minimum guaranteed bandwidth exceeds an aggregate excess consumption of the second group;
- determining whether the first group is empty in response to determining that the excess capacity over the aggregate minimum guaranteed bandwidth exceeds the aggregate excess consumption of the second group;
- setting the stop bit associated with each volume of the second group in response to determining that the first group is not empty; and
- clearing the stop bit associated with each volume that has not consumed its associated maximum allowed bandwidth in response to determining that the first group is empty.

24. The method of claim 20, further comprising:
- determining, by the computing device, whether a first logical volume having a first minimum guaranteed bandwidth that is nonzero has consumed less than the first minimum guaranteed bandwidth; and
- reassigning, by the computing device, a first part of the first minimum guaranteed bandwidth to one or more other logical volumes in response to determining that the first logical volume has consumed less than the first minimum guaranteed bandwidth.

25. The method of claim 24, further comprising:
- determining, by the computing device, whether a current usage of the first logical volume exceeds currently available bandwidth in response to reassigning the first part of the first minimum guaranteed bandwidth; and
- restoring, by the computing device, bandwidth credit to the first logical volume up to the first minimum guaranteed bandwidth in response to determining that the current usage of the first logical volume exceeds the currently available bandwidth.

* * * * *